(12) United States Patent
Rabeler et al.

(10) Patent No.: US 9,026,718 B2
(45) Date of Patent: May 5, 2015

(54) METHOD AND APPARATUS FOR FAULT TOLERANT FOTA UPDATE WITH SINGLE BACKUP BLOCK WRITE

(75) Inventors: Bryan Eugene Rabeler, Keller, TX (US); Tao Xue, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 13/493,383

(22) Filed: Jun. 11, 2012

(65) Prior Publication Data

US 2013/0332647 A1 Dec. 12, 2013

(51) Int. Cl.
*G06F 12/16* (2006.01)
*G06F 9/445* (2006.01)
*G06F 12/02* (2006.01)

(52) U.S. Cl.
CPC *G06F 8/65* (2013.01); *G06F 8/665* (2013.01); *G06F 12/0246* (2013.01)

(58) Field of Classification Search
CPC ....... G06F 11/1433; G06F 8/665; G06F 8/68; G06F 11/1458; G06F 11/1469; G06F 11/2094; G06F 21/6218; G06F 12/0246; G06F 2212/2022; G06F 8/60; G06F 8/65; G06F 11/0751; G06F 11/1004; G06F 9/44505; G11C 16/3404; G11C 16/00; G11C 29/82; H02H 3/042; H02H 3/05

USPC .......................................... 711/103; 714/807
See application file for complete search history.

(56) References Cited

U.S. PATENT DOCUMENTS

| 7,356,727 | B1 * | 4/2008 | McGhee et al. ................... 714/2 |
| 2005/0257023 | A1 * | 11/2005 | Peng ............................. 711/209 |
| 2010/0313194 | A1 * | 12/2010 | Juneja ........................... 717/171 |
| 2010/0325523 | A1 | 12/2010 | Slyz et al. |
| 2011/0201327 | A1 * | 8/2011 | Kaul ............................. 455/425 |
| 2011/0271041 | A1 * | 11/2011 | Lee et al. ....................... 711/103 |
| 2012/0151196 | A1 * | 6/2012 | May et al. ......................... 713/1 |

FOREIGN PATENT DOCUMENTS

WO 2008/084488 A2 7/2008

* cited by examiner

*Primary Examiner* — Hashem Farrokh
(74) *Attorney, Agent, or Firm* — Jefferson IP Law, LLP

(57) ABSTRACT

A method for recovering from an interruption during a Firmware Over-The-Air (FOTA) update is provided. The method includes identifying a missing block of a plurality of blocks to be updated in the first memory, the missing block corresponding to a block being updated when the interruption occurred, copying a backup block into a backup buffer, simulating an application of the FOTA update in a second memory, the simulation including, for each block of the plurality of blocks to be updated, performing a reversible operation on the contents of the backup buffer and an updated block, and updating the backup buffer with the operation result, replacing the missing block with the updated backup buffer, and resuming the FOTA update.

17 Claims, 5 Drawing Sheets

METHOD AND APPARATUS FOR FAULT TOLERANT FOTA UPDATE WITH SINGLE BACKUP BLOCK WRITE

BACKGROUND OF THE INVENTION

1. Field of the Invention

The present invention relates to Firmware Over-The-Air (FOTA) updates. More particularly, the present invention relates to a method for efficient backup during a FOTA update.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Software to control a mobile terminal is typically stored as firmware. Typically, in order to update the firmware, the user had to download an entire copy of the updated firmware, and then install the updated firmware on the mobile terminal. In many cases, the user had to download the updated firmware to a desktop or laptop computer to which the mobile terminal was attached, instead of controlling the updating process directly from the mobile terminal.

Recently, the concept of Firmware-Over-The-Air (FOTA) has been introduced. In this technique, an update package is delivered to the mobile terminal wirelessly. The update package includes a series of instructions which, when applied to the existing firmware, update the firmware to the newer version. An update client stored on the mobile terminal executes the instructions in the update package to modify the existing firmware and produce the updated version. Generally, the update package only includes the information needed to update the existing firmware to the new version. The update package does not include data corresponding to the portion of the firmware that is not being updated. As a result, the size of the update package is reduced.

However, problems may occur if a power loss occurs during the update process. The firmware is stored in non-volatile memory, usually either NAND flash or NOR flash. Flash memory is organized into blocks (also referred to as sectors) with a typical size between 64 KB and 256 KB. In order to modify any byte in a particular block, the entire block should be erased before the block can be written to. Erasing a block causes all the bytes to be set to 0xFF. Because of this restriction, modifying a block is not an atomic operation; power loss in the middle of this process can cause the contents of the block currently being updated to be in an unpredictable state. Since in most cases the original content of each block is needed in order to perform the update, the block which was being updated when the interruption occurred cannot be reconstructed. It is therefore advantageous to provide methods for fault tolerant FOTA update so that the update client can recover from power loss and resume the update successfully.

To ensure that the update process can continue from the point of interruption, the update engine performs an extra step before erasing and writing a block. Before erasing and writing a block, the update engine first writes the modified content to a backup (or temporary) block first. Once the content has been written to the backup block, it is safe for the update engine to erase and write the modified content to the block to be updated. If a power failure occurs after the erase but before the write completes, the update engine can recover by reading the modified content from the backup block.

Alternatively, the update engine could write the original content to the backup block. In this case, if a power failure occurs after the erase but before the write completes, the update engine can recover by reading the original content from the backup block and applying the update again to obtain the modified content.

In either case, however, the update engine performs an extra write operation whenever the update engine updates a block of the firmware image. These extra write operations increase linearly with the size of the number of blocks to be updated. The extra operations increase the amount of time needed for the update process to occur. It is therefore desirable to reduce the number of unnecessary backup operations during the updated process.

SUMMARY OF THE INVENTION

Aspects of the present invention are to address at least the above-mentioned problems and/or disadvantages and to provide at least the advantages described below. Accordingly, an aspect of the present invention is to provide a method for updating a firmware in a fault tolerant fashion by writing to a backup block at most once.

In accordance with an aspect of the present invention, a method for generating a backup block for recovering from an interruption in a Firmware Over-The-Air (FOTA) update is provided. The method includes initializing a backup buffer, for each block to be updated, simulating application of the FOTA update to the block, performing a reversible operation on the updated block and the backup buffer, and updating the backup buffer with the operation result, and writing the updated backup buffer to a backup block.

In accordance with another aspect of the present invention, a method of recovering from an interruption during a FOTA update to a first memory is provided. The method includes identifying a missing block of a plurality of blocks to be updated in the first memory, the missing block corresponding to a block being updated when the interruption occurred, copying a backup block into a backup buffer, simulating an application of the FOTA update in a second memory, the simulation including, for each block of the plurality of blocks to be updated, performing a reversible operation on the contents of the backup buffer and an updated block, and updating the backup buffer with the operation result, replacing the missing block with the updated backup buffer, and resuming the FOTA update.

In accordance with another aspect of the present invention, a device for receiving a FOTA update is provided. The device includes a communication unit for receiving an update package from an external device, a flash memory for storing a plurality of blocks to be updated according to instructions contained in the update package, Random Access Memory (RAM), and an update engine for obtaining a backup block based on information contained in the update package, for updating the plurality of blocks in the flash memory according to the instructions contained in the update package, for, when the updating of the plurality of blocks is interrupted prematurely, extracting a block from the backup block corresponding to a missing block that was being updated when the interruption occurred, and for resuming the updating of the plurality of blocks according to the extracted block, wherein the backup block represents a series of reversible operations applied to updated blocks corresponding to each of the plurality of blocks which the instructions in the update package indicate are to be updated.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include a method to provide a fault tolerant Firmware Over-The-Air (FOTA) update process. However, while the exemplary embodiments are described herein with respect to a FOTA update process in which a plurality of firmware blocks are updated, exemplary embodiments of the present invention could also be applied to other update processes. For example, an update procedure according to an exemplary embodiment of the present invention could be applied to a file system, in which the objects to be updated are files as opposed to firmware blocks.

Figure 1:
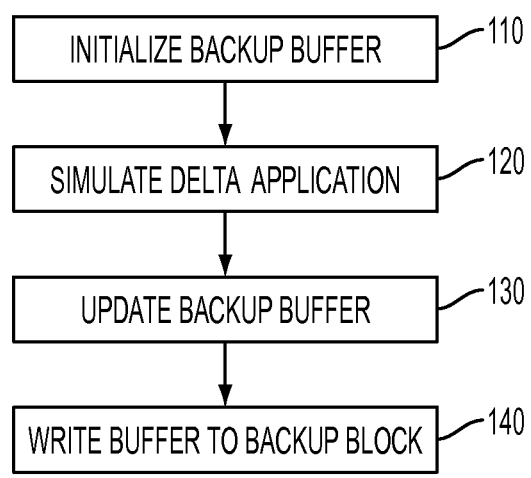
FIG. 1 is a flowchart of a method of preparing a backup block according to an exemplary embodiment of the present invention.

FIG. 1 is a flowchart of a method of preparing a backup block according to an exemplary embodiment of the present invention.

Referring to FIG. 1, an update engine of a device to be updated initializes a backup buffer in step 110. The initializing process may include ensuring that the backup buffer is initially filled with zeros.

In step 120, the update engine simulates the applying of an update package in RAM, on a block by block basis. Each time a block in the RAM is updated, the update engine performs a bitwise XOR operation with the updated block and the current contents of the backup buffer and updates the backup buffer with the results of the bitwise XOR operation in step 130. When the simulation is complete, the backup buffer will represent a bitwise XOR of all of the modified blocks. In step 140, the backup buffer is written to the backup block. The update engine may then begin the update process.

Figures 2A, 2B:
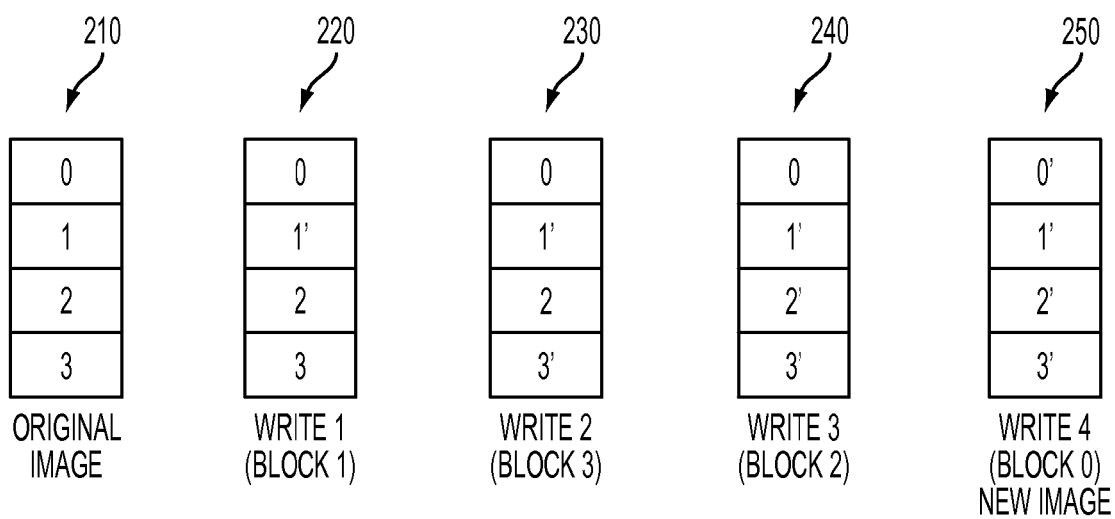
FIGS. 2A and 2B show examples of generating a backup block which may be used to recover an update process after an interruption, according to an exemplary embodiment of the present invention.

FIGS. 2A and 2B show examples of generating a backup block which may be used to recover an update process after an interruption, according to an exemplary embodiment of the present invention.

Referring to FIGS. 2A and 2B, an original image 210 is modified by four separate write actions, shown in intermediate images 220, 230, and 240, resulting in a new image 250. To generate the new image 250, each write is simulated in memory. After each simulated write, the backup buffer is updated according to the modified block. For example, the first write operation is a write to block 1, resulting in the intermediate image 220 having the updated block 1'. When the backup buffer is updated to reflect the updated block 1', the backup buffer will include the value 1', since in this case 1' is the first block to be updated.

The second write operation is a write to block 3, resulting in the intermediate image 220 having the updated block 3'. The update engine performs a bitwise XOR operation on the contents of the backup buffer (in this case, 1') and the updated block (in this case, 3'). After performing this operation for each of the other updated blocks 2' and 0', the backup buffer will have the value B' representing the bitwise XOR of each of the updated blocks, as shown in FIG. 2B.

The backup block may be generated by the device being updated prior to beginning the update process. However, the backup block may also be generated using the same method before being transmitted to the device and included in the update package transmitted to the device. In this case, when the backup block is needed, the device being updated may simply copy the backup block into memory and omit the generation of the backup block. This may be useful when the size of the backup block may be relatively small in comparison to the size of the update package.

The update package may also include a checksum of the backup block. The device may use the checksum to determine the validity of the backup block prior to resuming the update process after an interruption. The inclusion of such a checksum would enable the device to avoid attempting to resume an update after interruption only to determine that the backup block is invalid or associated with another update package.

In the example shown in FIGS. 2A and 2B, the backup buffer is updated in the order in which the blocks are updated, which may be set in the update package or determined by the update engine. However, the backup buffer may be updated in any order. Similarly, the content of original blocks (i.e., blocks that do not changed during the update process) may also be included in the bitwise XOR calculation of the backup block, but their inclusion does not aid resuming an update after interruption. Also, constant data may also be included in the bitwise XOR calculation, so long as this constant data is removed via the bitwise XOR calculation during the recovery process.

Once the backup block has been obtained (either through a process such as the method shown in FIG. 1 or by extracting the backup block from the update package), the device begins the update process. If the update process is interrupted due to, for example, a power failure, the device begins the recovery process by determining where to continue with the update process. Due to the interruption, the content of the block being written to when the update terminated is in an unpredictable state. The content of this 'missing' block may be extracted from the backup block according to a method such as the method described below with respect to FIGS. 3 and 4A-4B.

Figure 3:
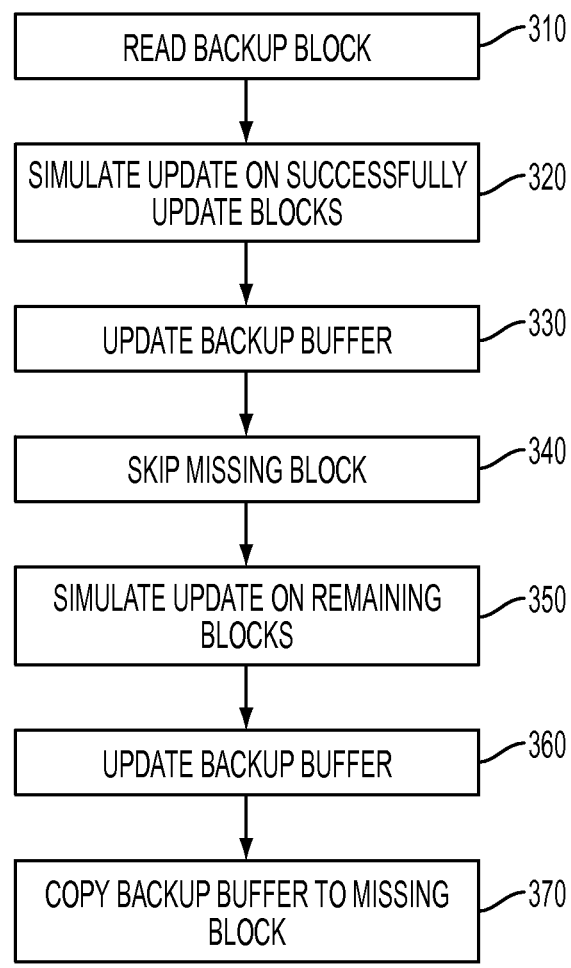
FIG. 3 is a flowchart of a method of recovering an update process after an interruption, according to exemplary embodiments of the present invention.

FIG. 3 is a flowchart of a method of recovering an update process after an interruption, according to exemplary embodiments of the present invention.

Referring to FIG. 3, the device reads the backup block into a backup buffer in step 310. In step 320, the device simulates applying the update in RAM block by block. For the blocks that were successfully updated before the update process was interrupted, the device reads the block from the flash memory. In step 330, the device performs a bitwise XOR operation on the updated block and the backup buffer, and updates the backup buffer with the results of the bitwise XOR.

In step 340, the device skips the missing block. Since the update process was interrupted while writing to this block, the contents of this block in the flash memory are in an undetermined state. This block is therefore skipped.

In step 350, the device completes the simulation with the blocks that were not yet updated. For these blocks, the device simulates the update by generating the block's modified content according to the instructions in the update package. In step 360, the device performs a bitwise XOR on the backup buffer using each of the updated blocks, and updates the backup buffer with the results of the bitwise XOR operation.

After a bitwise XOR operation has been performed on the backup buffer using every modified block other than the missing block, the contents of the backup buffer will be the updated block corresponding to the missing block. Each bitwise XOR operation between the backup block and an updated block effectively cancels out the updated block in the backup block. Since the missing block is skipped in the recovery process, the updated block corresponding to the missing block is the only block which is not cancelled out, and thus remains in the backup block at the end of the recovery process. Accordingly, in step 370 the device writes the contents of the backup buffer to the missing block in flash memory. At this point the recovery process is complete and the update process may resume with the next block to be updated.

The simulation may update the blocks and the backup buffer in any order. For example, the update engine could simulate the application of the update to the blocks that were not updated when the interruption occurred (i.e., steps 350 and 360) first, before updating the backup buffer based on the successfully updated blocks (i.e., steps 320 and 330).

Figures 4A, 4B:
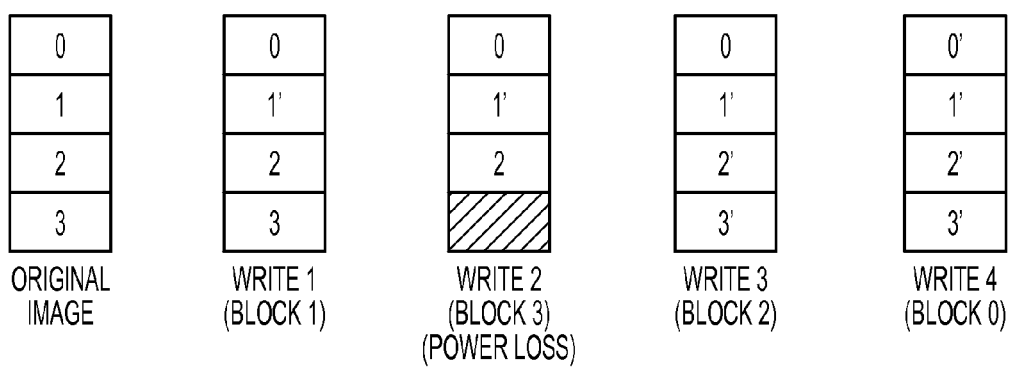
FIGS. 4A and 4B show examples of using a backup block to recover an update process after an interruption, according to an exemplary embodiment of the present invention.

FIGS. 4A and 4B show examples of using a backup block to recover an update process after an interruption, according to an exemplary embodiment of the present invention.

Referring to FIGS. 4A and 4B, the update process was interrupted while writing block 3, leaving block 3 in an undetermined state. To retrieve the contents of block 3, the device copies the backup block to RAM and simulates the application of the update. Block 1 was successfully updated before the interruption, and so the device merely performs a bitwise XOR operation between the backup buffer and the contents of Block 1 (i.e., 1') in flash memory, and updates the backup buffer with the results. For the remaining blocks, blocks 0 and 2, the device simulates applying the update to these blocks and performs a bitwise XOR operation between the contents of the backup buffer and the contents of the updated blocks 0 and 2 (i.e., 0' and 2'). The result of these bitwise XOR operations is 3', the updated contents of block 3. The device may then write this content to block 3 and proceed with the update process.

While the process has been described with respect to updating flash blocks, the process may be extended to include updates to a read/write file system.

According to an exemplary embodiment of the present invention, the content of the backup block may be calculated using another reversible operation, instead of bitwise XOR. For example, addition or subtraction without carry could be employed to calculate the content of the backup block.

Exemplary embodiments of the present invention may be applicable to any device on which content may be updated via a FOTA process. For example, the device may be a desktop or laptop computer, smartphone, tablet, Personal Digital Assistant (PDA), or the like. An example of such a device is described below with respect to FIG. 5.

Figure 5:
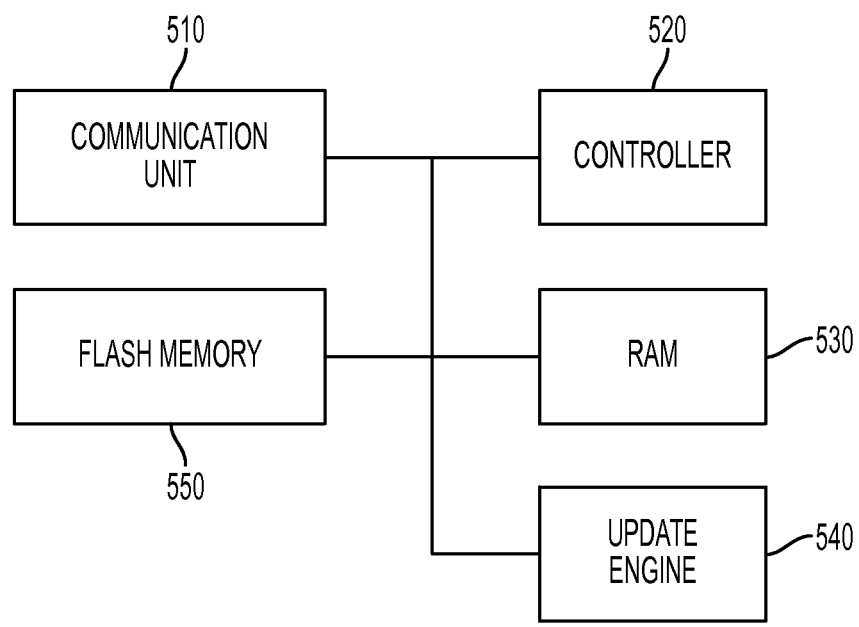
FIG. 5 is a diagram of a device according to an exemplary embodiment of the present invention.

FIG. 5 is a diagram of a device according to an exemplary embodiment of the present invention.

Referring to FIG. 5, the device includes a communication unit 510, a controller 520, a RAM 530, an update engine 540, and a flash memory 550. The device may also include other units, not shown here, depending on the device's functionality. Such units may include a display unit, an input unit, a Global Positioning System (GPS) unit, a camera unit, and the like.

The communication unit 510 receives the update package from an update server or other remote device. The communication unit 510 may include an RF transmitter (not shown) for up-converting the frequency of transmitted signals and amplifying the transmitted signals, and an RF receiver (not shown) for low-noise amplifying of received RF signals and down-converting the frequency of the received RF signals.

The controller 520 controls overall operations of the device. When the communication unit receives an update package, the controller 520 controls the update engine to prepare the backup block and perform the update of the blocks stored in the flash memory 550. If the update process is interrupted, the controller 520 controls the update process to reconstruct the missing block and resume the update, according to a method such as the one described above with respect to FIG. 3.

The update engine 540 updates the blocks of the flash memory 550 according to the instructions in the update package. If the update package does not include a copy of the backup block, the update engine 540 may generate the backup block according to a method such as the method described above with respect to FIG. 1.

If the update engine 540 is unable to complete the update (for example, due to a power loss), the update engine 540 determines where the update process was terminated and identifies the missing block. The update engine 540 may employ any appropriate technique for determining this information. Once the missing block has been identified, the update engine extracts the updated content of the missing block from the backup block, according to a method such as the method described above with respect to FIG. 3.

It would be understood that the update engine 540 may be implemented as software code stored in a non-volatile memory of the device (such as a hard drive) and executed by the controller 520. However, the update engine 540 may alternatively be implemented as separate logic from the controller 520.

The RAM 530 is an example of volatile memory. When simulating the application of the update package as shown in FIGS. 1 and 3, the update engine 540 temporarily stores copies of the blocks in the RAM 530, as needed. According to an exemplary embodiment of the present invention, any type of volatile memory may be employed for this temporary storage.

The flash memory 550 stores the blocks of data to be updated. According to an exemplary embodiment of the present invention, the blocks of data to be updated may be firmware of the device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating a backup block for recovering from an interruption in a Firmware Over-The-Air (FOTA) update, the method comprising:
  initializing a backup buffer;
  simulating an application of the FOTA update to blocks in a volatile memory, the simulating of the application including:
    for each block in the volatile memory to be updated, updating the block according to the FOTA update, performing a reversible operation on the updated block and the backup buffer, and updating the backup buffer with the result of the reversible operation; and
  writing the updated backup buffer to a backup block.

2. The method of claim 1, wherein the reversible operation is one of a bitwise XOR operation, addition without carry, and subtraction without carry.

3. The method of claim 1, wherein the FOTA update is a firmware update.

4. The method of claim 1, wherein the FOTA update is a file system update.

5. The method of claim 1, further comprising:
  for each block is that is not updated, performing a reversible operation on the block and the backup buffer, and updating the backup buffer with the operation result.

6. A method of recovering from an interruption during a Firmware Over-The-Air (FOTA) update to a first memory, the method comprising:
  determining that the FOTA updated has not completed successfully;
  identifying a missing block of a plurality of blocks to be updated in the first memory, the missing block corresponding to a block being updated when the interruption occurred;
  copying a backup block into a backup buffer;
  simulating an application of the FOTA update in a second memory, the simulation including:
    for each block successfully updated in the first memory, reading the block from the first memory, performing a reversible operation on the contents of the backup buffer and the block read from the second memory, and replacing the backup buffer with the result of the reversible operation, and
    for each block not successfully updated in the first memory other than the missing block, generating a corresponding updated block in the second memory according to the FOTA update, performing the reversible operation of the generated updated block and the contents of the backup buffer, and replacing the backup buffer with the result of the reversible operation,
  replacing the missing block with the contents of the backup buffer after the simulation is complete; and
  resuming the FOTA update,
  wherein the first memory is a flash memory, and
  wherein the second memory is a volatile memory other than the first memory.

7. The method of claim 6, wherein the simulating of the application of the FOTA update further comprises:
  during the simulating of the application, skipping the simulation of the updating of the missing block.

8. The method of claim 6, wherein the reversible operation corresponds to an operation used to generate the backup block.

9. The method of claim 8, wherein the reversible operation is one of a bitwise XOR operation, addition without carry, and subtraction without carry.

10. The method of claim 6, wherein the FOTA update is at least one of a firmware update or a file system update.

11. The method of claim 6, wherein the update package includes a copy of the backup block.

12. The method of claim 6, wherein the update package includes a checksum of the backup block, and
  wherein the method further comprises determining whether the backup block is valid, based on the checksum.

13. A device for receiving a Firmware Over-The-Air (FOTA) update, the device comprising:
  a communication unit configured to receive an update package from an external device;
  a flash memory configured to store a plurality of blocks to be updated according to instructions contained in the update package;
  Random Access Memory (RAM); and
  an update engine configured:
    to obtaining a backup block based on information contained in the update package, to update the plurality of blocks in the flash memory according to the instructions contained in the update package, to, when the updating of the plurality of blocks is interrupted prematurely, extract a block from the backup block corresponding to a missing block that was being updated when the interruption occurred, and to resume the updating of the plurality of blocks according to the extracted block,
  wherein the backup block represents a series of reversible operations applied to updated blocks corresponding to each of the plurality of blocks which the instructions in the update package indicate are to be updated, and wherein the update engine extracts the block by simulating an application of the instructions in the update package, the simulating comprising:

initializing a backup buffer in the RAM;

for each block successfully updated in the flash memory, reading the block from the flash memory, performing a reversible operation on the contents of the backup buffer and the block read from the second memory, and replacing the backup buffer with the result of the reversible operation, and for each block not successfully updated in the flash memory other than the missing block, generating a corresponding updated block in the RAM according to the FOTA update, performing the reversible operation on the generated updated block and the contents of the backup buffer, and replacing the backup buffer with the result of the reversible operation.

14. The device of claim 13, wherein the backup block is stored in the update package, and the update engine reads the backup block from the update package to a backup block buffer in RAM.

15. The device of claim 13, wherein the backup block represents a series of reversible operations applied to updated blocks corresponding to each of the plurality of blocks which the instructions in the update package indicate are to be updated.

16. The device of claim 13, wherein the reversible operation is one of a bitwise XOR operation, addition without carry, and subtraction without carry.

17. The device of claim 13, wherein the device is a mobile device.

* * * * *